Figure 1:
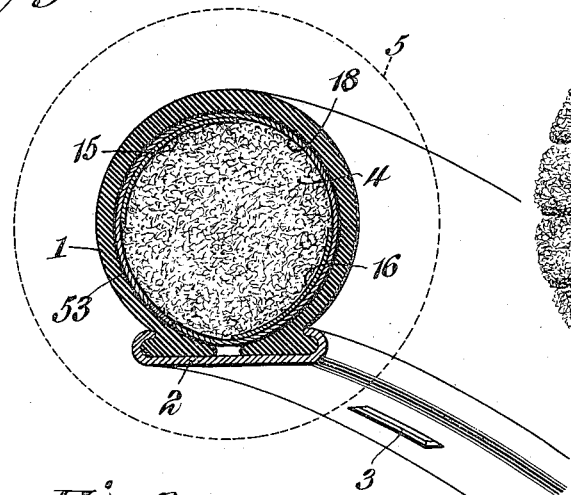

G. KELLY.
VEHICLE TIRE.
APPLICATION FILED SEPT. 24, 1915.

1,210,327.

Patented Dec. 26, 1916.
4 SHEETS—SHEET 1.

WITNESSES:
Howard D. Orr.
F. T. Chapman.

George Kelly,
INVENTOR,
BY E. G. Siggers.
Attorney

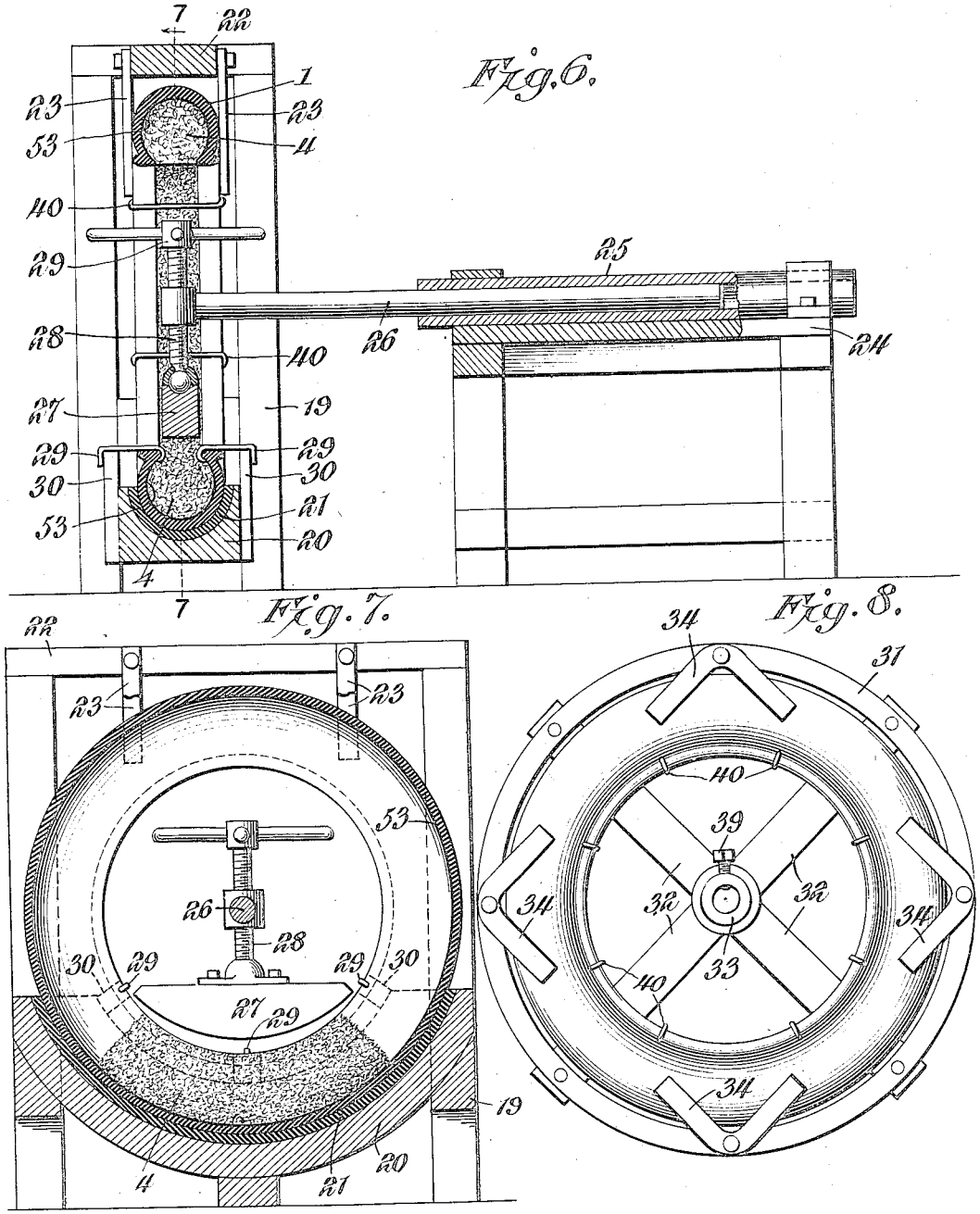

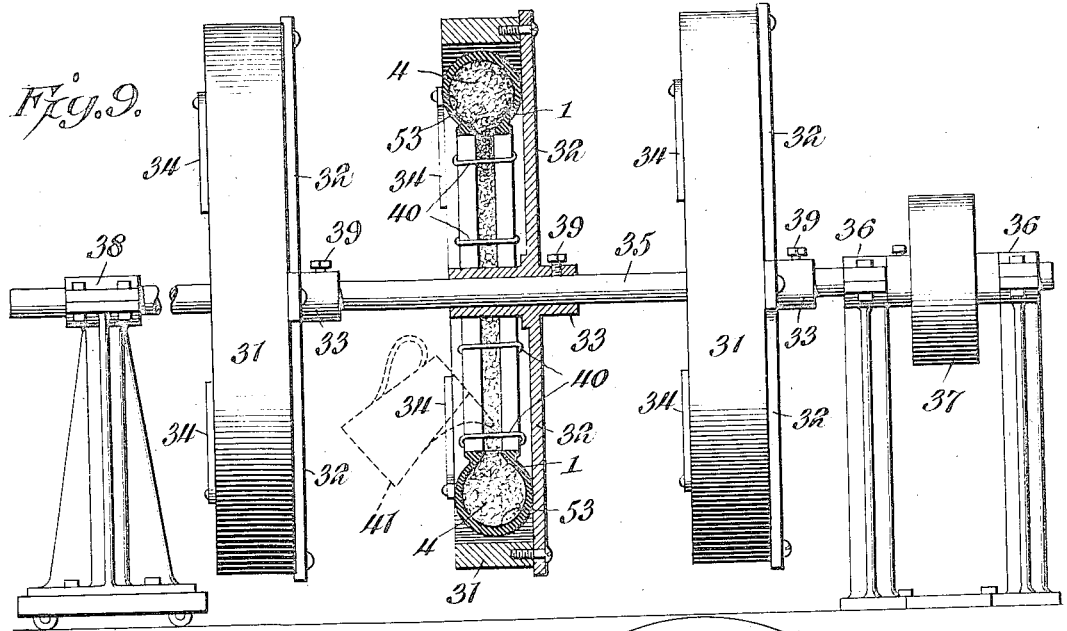
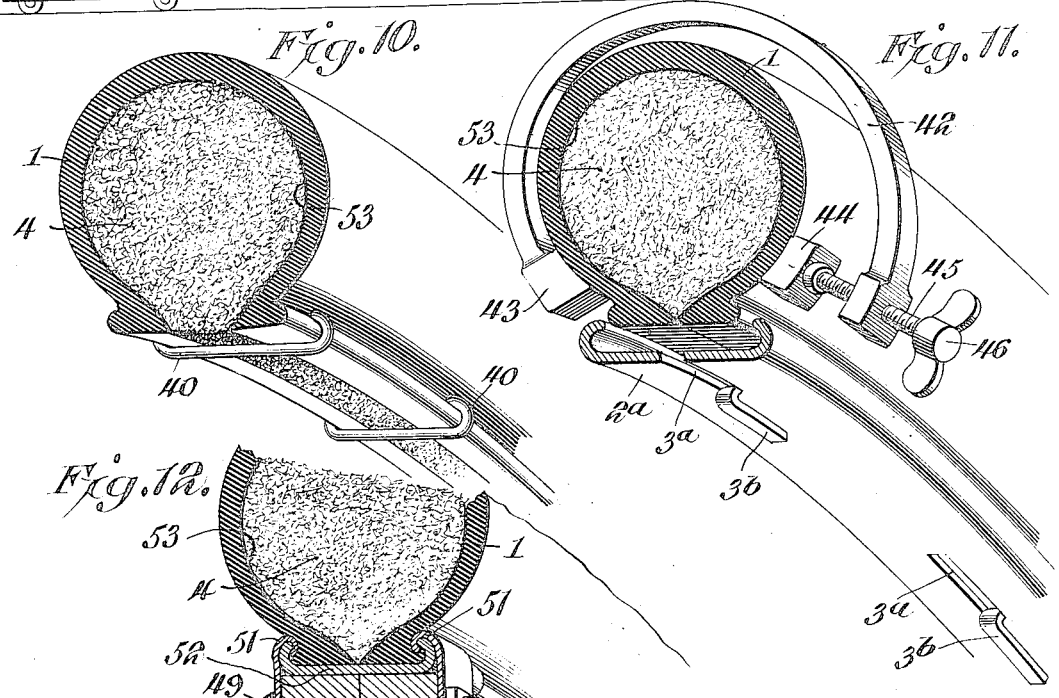

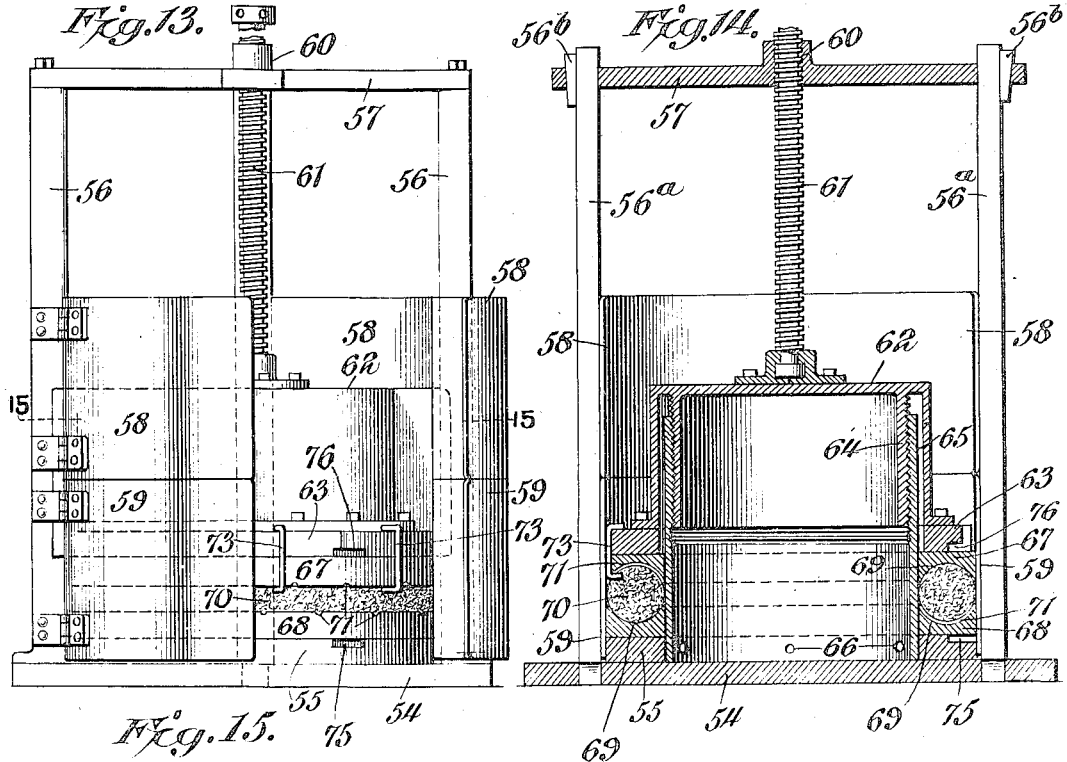

UNITED STATES PATENT OFFICE.

GEORGE KELLY, OF HINSDALE, ILLINOIS.

VEHICLE-TIRE.

1,210,327.   Specification of Letters Patent.   Patented Dec. 26, 1916.

Application filed September 24, 1915. Serial No. 52,427.

*To all whom it may concern:*

Be it known that I, GEORGE KELLY, a citizen of the United States, residing at Hinsdale, in the county of Dupage and State of Illinois, have invented a new and useful Vehicle-Tire, of which the following is a specification.

This invention has reference to vehicle tires, and its object is to provide a filler for the outer casings of pneumatic tires which will replace the inner tube ordinarily employed for containing air under pressure, and by the substitution obtain elastic effects similar to those obtained in the ordinary pneumatic tire when the inner tube is filled with air under pressure.

The present invention has the further advantage of providing a tire having an elasticity approaching that of the pneumatic tire, but being free from collapse due to puncture.

In accordance with the present invention advantage is taken of the elastic nature of certain fibrous materials, such as horsehair, whether natural or artificial, and also the elasticity of certain gums, such as rubber, combined with the fibrous material to unite the fibers without embedding them in a solid mass, whereby pressure may be applied to the filler either before or after its introduction into the outer casing, to condense it against its natural tendency until a mass considerably larger than the interior of the tire casing is compressed to a size to fill the interior of said casing. If the mass is compressed before its introduction into the casing it is so bound that in the compressed state it may be readily introduced into the casing and then the compressing means may be released to permit the introduced material to expand under its natural tendency to again assume its original size, whereby there is provided within the casing an elastic outwardly exerted force sufficient to sustain so much of the weight of the vehicle as may be borne by a wheel, and which at the same time will yield to a suddenly exerted force in a manner to absorb shocks or jars and prevent their conveyance to the body of the vehicle.

In accordance with the present invention the horsehair, either natural or artificial, or some other fibrous material, as, for instance, a vegetable fiber, such as seaweed or the like in the dry state, is infiltrated with a solution of an elastic gum of which rubber may be taken as an example. The infiltration, however, is not so complete but that the mass when dry contains numerous interstices or cavities, the infiltration being performed in a manner to be hereinafter described, and this infiltration may be performed before the fibrous material is introduced into the casing, or after such introduction, as will hereinafter appear. Moreover, the filler may be compressed to an extent agreeable with the expansive force desired within the casing before such filler is introduced into the casing, in which case the filler is provided with a binder holding it in the compressed condition before introduction into the casing, and after the casing is applied to the wheel the binder is released in a manner to be hereinafter described.

The invention also contemplates in place of such procedure the compression of the fibrous material to an extent in the act of introducing it into the casing, the infiltration of the fibrous material after such introduction, and a final additional compression by the application of the casing to the wheel rim.

In so far as the present invention has to do with the production of a filler of natural or artificial horsehair infiltrated with an elastic gum, such as rubber, and the precompression of the infiltrated filler for introduction into the casing to be released from the binding employed to hold it so compressed, after the bound filler is introduced into the casing, this application is a continuation of my application No. 739,534, filed December 31, 1912.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified, so long as such changes and modifications come within the scope of the appended claims.

Figure 2:
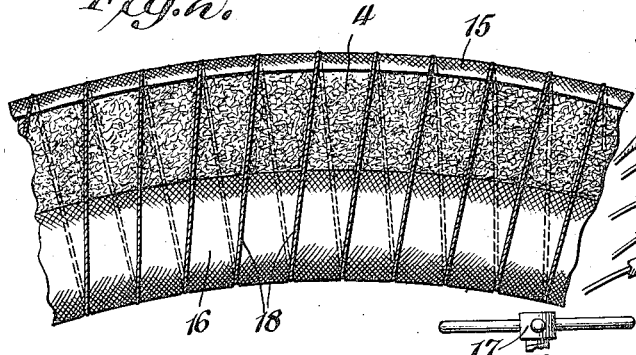

In the drawings: Figure 1 is a cross-section, with a fragmentary perspective projection, of a vehicle tire mounted on a rim and embodying certain features of the invention. Fig. 2 is an elevation of a fragment of a core in the compressed and bound condition preparatory to introduction into the tire casing.

Figure 5:
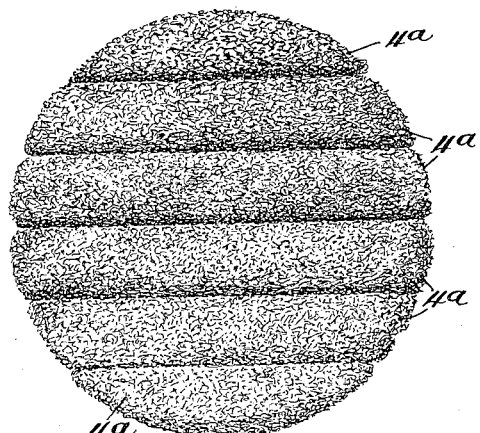
Figure 4:
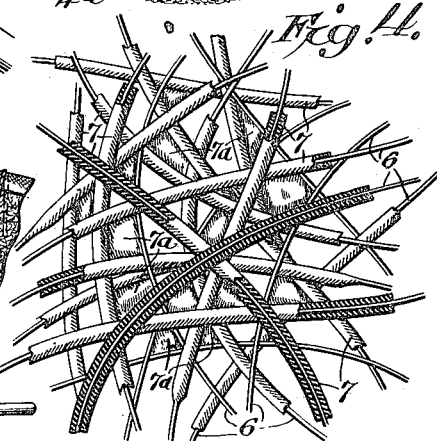
Figure 3:
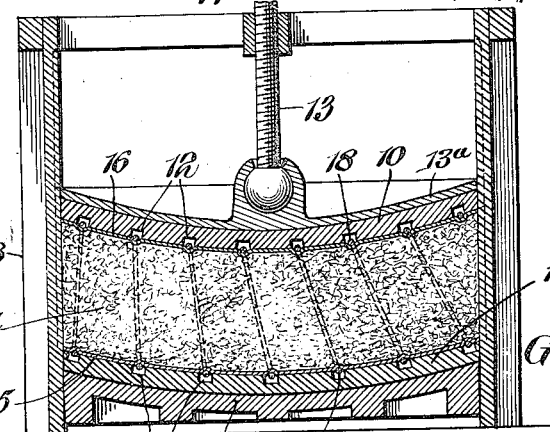

Fig. 3 is a section of a press for preparing the core of Fig. 2. Fig. 4 is a schematic view on a greatly enlarged scale of a small portion of the filler after being treated to a binder and drained but still uncompressed. Fig. 5 is a cross-section of a filler such as shown in the preceding figures, but made up of layers instead of a solid mass, and prior to compression. Fig. 6 is a cross-section of a tire showing a press partly in section and partly in elevation in operative relation to the tire, whereby the filler may be compressed directly into the tire, but prior to infiltration with the solution of gum. Fig. 7 is a section on the line 7—7 of Fig. 6, and showing but a portion of the casing occupied by the filler. Fig. 8 is an elevation of a support for the filled tire casing ready for the application of the gum solution. Fig. 9 is an elevation partly in section showing the manner of mounting a series of structures such as shown in Fig. 8 for rotating and illustrating the manner of applying the solution of gum. Fig. 10 is a cross-section with a perspective projection of a fragment of a tire casing with the filler introduced with such compression as is afforded by the structures of Figs. 6 and 7, and with the fibrous material infiltrated in the manner illustrated in Fig. 9 and with the beads of the casing held together in spaced relation by temporary clips. Fig. 11 is a cross-section of a tire casing and rim to which it is to be applied with a fragment of the casing and rim in perspective projection, and illustrating means for closing the beads together for the introduction into the rim. Fig. 12 is a cross-section of a completed tire with the rim of somewhat different form than in certain of the preceding figures. Fig. 13 is an elevation of a type of press for forming a complete circular core in one operation. Fig. 14 is a longitudinal vertical section of the press of Fig. 13. Fig. 15 is a section on the line 15—15 of Fig. 13. Fig. 16 is a perspective view of a compressed core with the core-molding rings in place thereon.

Referring to the drawings, and more particularly to Fig. 1, there is shown an outer casing 1 lodged in a rim 2 after the usual practice in automobile tires, except that the rim has slots 3 formed in it at suitable intervals for a purpose that will appear hereinafter. Within the tire there is lodged a filler 4, which filler is assumed to have been compressed from a normally large cross-sectional area to the size of the cross-sectional area of the casing. Merely to indicate that the compression is considerable the ordinary cross-sectional size of the filler may be assumed to be that of the dotted line indication 5 of Fig. 1, without, however, such indication being at all accurate. In the structure of Fig. 1 the filler is assumed to have been compressed before being placed in the casing and in the production of such a filler a suitable quantity of fibrous material, of which horsehair, whether natural or artificial, may be taken as an example, is infiltrated or saturated with a binder in solution, the solution preferred being a solution of soft rubber. Such infiltrated mass is then allowed to drain, which may be accomplished by suspending the infiltrated mass, and since the solution is liquid a large part of it will drain off leaving a sufficient quantity adherent to the fibers and held in some of the spaces between the fibers. The drained mass of fibrous material is then allowed to dry, which operation may be hastened by placing the drained mass in a warm compartment, thus facilitating the evaporation of the solvent.

Fig. 4 is an exaggerated and greatly enlarged and also more or less schematic showing of a drained and dried loose mass of fibers, such as horsehair, either natural or artificial. In Fig. 4 the individual fibers are represented at 6 with some having a coating 7 of rubber and at different points in the interstices of the mass adherent particles $7^a$ of rubber are indicated. In such a mass some fibers will not be coated, while others will be coated irregularly and the coated fibers are joined all through the mass with many open spaces and in some of the spaces the particles $7^a$ of dry rubber are imprisoned. There is, therefore, produced a highly porous or spongy mass of horsehair fibers and soft rubber under the assumption that horsehair and rubber are the substances employed. Natural horsehair because of its inherent elasticity is to be preferred, but artificial horsehair has the advantage of cheapness, and this is true of some other vegetable fibers such as those already named.

For the purposes of simplicity of description the term horsehair will be hereinafter used as indicative of either natural or artificial horsehair, or any equivalent fibrous material suitable for the purpose.

Horsehair fibers are quite elastic and the mass may be compressed and when released from pressure will tend to return to the ordinary uncompressed form. By incorporating soft rubber in the mass of horsehair a comparatively large amount of rubber is taken up without, however, reducing to too great an extent the porosity of the mass so that the bulk of the infiltrated mass may be greatly reduced by suitable pressure. This not only places the individual horsehairs under elastic strain, but the particles of rubber throughout the mass are also more or less distorted or put under elastic strain by the compression. The compressed filler, therefore, has an expansive tendency due to both the elasticity of the horsehairs and the elasticity of the rubber. Moreover, there is some air imprisoned in the mass and the elasticity of such air is utilizable. The filler may conveniently be made in the form of sheets or strips of suitable thickness, impregnated, drained and dried and then assembled face to face, as indicated in Fig. 5 at 4ᵃ. By forming the filler in comparatively thin strips the infiltration of the fibrous mass with the solution, the draining thereof, and the drying of the solution is facilitated.

The filler described has the advantage of being cheap, especially when artificial horsehair is employed, and the amount of rubber needed is not sufficient to raise the cost of the filler inordinately. Moreover, the filler may be cheaply manufactured so far as labor is concerned, and when once placed in the casing it produces a tire having an elasticity approaching that of a pneumatic tire, but requiring no attention during the life of the casing.

For some purposes it is advantageous that the filler be furnished to the purchaser in the already compressed condition and compressed to a cross-sectional area permitting its ready introduction into the outer casing. It is not necessary that the compressed filler be furnished in complete ring shape, but may be furnished in sectional portions of a ring so that a suitable number of such portions will complete the ring.

In Fig. 3 there is indicated a press 8 with a bed 9 and followers 10 and 10ᵃ. The bed 9 and the followers in the particular showing of the drawings include but a section of a ring-shaped filler and the followers have suitable grooves 11, 12, therein. The follower 10 is propelled toward the bed by a screw 13 and head 13ᵃ. It will be understood that the press may be of any shape desired to form the complete core at one time or to form the core in sections. The core might be made straight and then bent into ring shape, but it is preferred to make it initially circular so as to avoid the difficulty of bending a straight core into ring shape. A mass 4 of horsehair infiltrated with rubber is placed in the press, the bed having a layer 15 of canvas or other fabric thereon and the mass of hair 4 where engaged by the follower having a layer 16 of canvas or other fibrous material thereon. By a suitable manipulation of the screw 13, as by means of a capstan head 17 thereon, the follower 10 is made to approach the follower 10ᵃ on the bed 9 until the mass 4 is compressed to the desired degree. This having been accomplished a cord 18 is threaded through the passages 11 and 12 in proper order and suitably secured after being drawn tightly about the compressed mass, so that on the release of the mass 4 from the pressure exerted by the follower 10 the mass can expand for but a small fractional portion of its compressed size before the expansion is arrested by the cord 18. Or, a preferable way is to secure the two followers together after the mass 4 is compressed, remove them from the press and then apply the cord or lacing 18. The result is the filler 4 of Fig. 2 of a cross-sectional area such as will permit its ready introduction into the casing 1 and the application of the casing to the rim 2. In order that the filler may exert an expansive force upon the inner wall of the casing, the cord or lacing 18 is cut by means of a knife blade or other sharp instrument introduced through one or more of the slots 3 between the adjacent edges of the bead portion of the tire, and then the cord no longer exerting a restraining force upon the expansive tendency of the compressed filler the latter expands until the casing is in tight embracing relation to the filler. However, the filler is still under such compression as to sustain the load placed upon the tire in the ordinary course of travel. Should the tire come into contact with an obstruction, it will yield in like manner to a pneumatic tire, and the yielding of the filler because of its inherent elasticity prevents the transmission of shocks and jars to the vehicle in much the same manner as does a pneumatic tire. For some purposes it is advisable to furnish the casing with the filler already installed therein at the factory, so that the user has but to apply the casing to the rim, and it is even feasible to supply the outer casings already mounted on the rims if the latter be made of the demountable type. Again, as is not uncommon, the filled casing may be supplied to the customer already mounted upon an extra wheel.

In order to introduce the filler into a casing before infiltration with the rubber or other solution of elastic gum of which rubber may be taken as typical, the structures of Figs. 6 and 7 may be employed. In this case there is provided a suitable framework 19 containing a curved bed 20 with an elastic or soft facing 21 to receive the outer casing 1 of a tire and support the same throughout a considerable circumferential extent. The frame 19 has a top bar 22 carrying holding fingers 23 which may be simply pivotally and pendently supported from the bar 22, since their purpose is merely to maintain the casing 1 in a substantially upright position. Adjacent to the frame 19 is a table or support 24 on which is mounted a cylindrical guide 25 entered by a rod 26 carrying at one end a follower 27 by means of a manipulating screw 28 provided with a capstan head 29. The follower 27 is in coactive relation to the bed 20 so as to enter between the beads of the tire casing 1, which beads are spread apart by means of clips 29 engaging the beads and blocks 30 or other holding means on the bed 20. In Fig. 7 a mass 4 of horsehair is indicated as lodged in the lower part of the casing 1 in position to be engaged by the follower 27, whereby the mass is compressed into the casing between the spread-apart beads of the casing. By turning the casing around its axis subsequent masses of horsehair may be introduced and compressed therein until the casing is completely filled, as indicated in Fig. 6. The compression of the horsehair while it may be considerable, is not the final compression.

After the casing is filled with horsehair it is removed from the frame 19 and placed in a circular holder 31 carried by spokes 32 radiating from a hub 33. These spokes are arranged on one side of the circular or ring-like holder and on the other side thereof are rockable fingers 34 movable into position to hold the filled casing in place. Any suitable number of holders 31 are mounted upon a shaft 35 having bearings 36 at one end and a drive pulley 37 at the same end, while the other end of the shaft is carried by a movable bearing 38 so arranged as to be moved out of the way of the shaft for the introduction of the carriers 31 thereon. The hubs 33 of these carriers are each provided with a set screw 39 permitting the securing of the hub to the shaft.

Now a solution of rubber is poured into the mass of horsehair in the casing through the spread-apart beads, and these beads may be temporarily held from spreading beyond a certain distance by clips 40 with hooked ends engaging over the edges of the beads. By pouring a suitable quantity of rubber solution into the horsehair in the tire casing and slowly turning the tire, such solution is distributed and the pouring may be continued until the horsehair contains the desired quantity of solution. On the evaporation of the solution the rubber is deposited upon the fibers of horsehair and no longer completely fills the mass of fibers, so that the latter presents a spongy mass of horsehair and rubber. A convenient way of introducing the rubber solution into the tire casing is by means of a container or pitcher 41 shown in dotted lines in Fig. 9.

After the tire casing has been filled with horsehair more or less compacted and infiltrated with rubber, it is removed from the carrier 31 with, however, the clips 40 still in position, and such a tire is shown in Fig. 10. Now, in order to apply the tire to a rim such as the rim $2^a$ shown in Fig. 11, one or more compression yokes 42 are employed. Such a yoke has a head 43 at one end and a follower 44 at the other end under the control of a manipulating screw 45 provided with a wing or other head 46. With such a compression yoke applied to opposite sides of the tire casing near the beads the latter are made to approach until close enough together to be introduced on to the rim $2^a$ and then the beads are allowed to expand to engage the rim in the usual manner. The amount of compression applied to the tire casing adds to the compression of the horsehair already within the casing, so that by the time the tire is in the installed position on the rim $2^a$ the filler is compressed to such extent as to sustain the load, but is still sufficiently elastic to absorb shocks and jars to which the tire may be subjected. In Fig. 11 the rim $2^a$ is indicated as formed with slots $3^a$ with the material cut away to produce the slot connected to the rim at one end and turned back to form a tongue $3^b$. The slots $3^a$ permit the use of the rim $2^a$ for a precompressed and bound filler such as shown in Figs. 1 and 2 and 3.

In Fig. 12 the wheel is assumed to be provided with a wooden felly 47 made up of two members joined side to side along a line indicated at 48 with the two members held together at suitable points by bolts 49 traversing plates 50 made fast to the respective parts of the felly and each formed at one end into a hook 51 engaging over a clip 52 confining the beads of the tire casing 1. It is further assumed in Fig. 12 that the beads have been carried to approach in the same manner as in Fig. 11 and that numerous clips 52 have been applied to so hold the beads in the approached condition. With such an arrangement the filler, which may be similar to the filler 4 of Fig. 1, and which is designated by the same reference numeral, may, after introduction into the casing 1, have its binding cord cut by a cutting blade introduced between the two members of the felly 47 before the bolts 49 are drawn up tight. The hooks 51 of the plates 50 engaging the clips 52 hold the tire securely on the felly.

There are certain advantages in the production of the filled tire casing where the horsehair is compacted into the casing before infiltration, and is afterward infiltered with the rubber solution. One of these advantages is that there need be no waste of rubber, and the only waste which occurs is that of solvent. In the case of producing the infiltration by soaking the mass of horsehair in the solution and then draining and drying it the loss of rubber may be sufficient to warrant the production of the filler casings at the factory instead of providing the compressed fillers for application to the casings by the purchasers. It will be understood, of course, that the clips 40 are simply temporarily applied and are removed before the tire casing is introduced into the rim $2^a$, but after the tire casing has been subjected to the compressing action of the yoke 42.

In order to protect the inner walls of the casing against the action of solvents which may reach such walls there is provided an interior coating which may be produced by applying a warm solution of gelatin and glycerin, indicated at 53. Such coating becomes sufficiently hard or dry in a very short time. It is possible to produce the filler by compressing the horsehair and lacing it to hold it under compression and then placing it in the casing and severing the lacing, with the casing so held as to prevent more than a very moderate expansion of the filler, after which the solution of rubber is poured into the filler to saturate the fibers. This procedure produces, when the solution has been evaporated, a more or less spongy mass of rubber throughout a pre-compressed mass of horsehair.

In the preparation of the filler, good results are obtained by using the horsehair and rubber solution in about the proportions of about one pint of rubber in solution at about the consistency of cream to every pound of horsehair compressed into a tire casing to about fifty pounds pressure. If other fibers less elastic than horsehair are used, more rubber solution must be employed with the elasticity of the fiber used. The pressure named should ordinarily be increased to about seventy or eighty pounds per square inch before or while placing the casing on the wheel rim. Different modes of compressing the horsehair into the form of a filler have been described, but no means have been set forth for producing a continuous filler of circular form which may be sold in such form for introduction into a tire casing. In Figs. 13 to 15, there is shown a press whereby a circular or ring shaped filler may be produced. The press comprises a base 54 with a bed plate 55 thereon, such bed plate being of annular or ring form. Erected on the base 54 on opposite sides of the bed plate 55 are posts 56 connected together at the top by a top member 57. Hinged to opposite sides of the posts 56 are doors 58, 59 which together constitute a compression chamber with the doors capable of being swung outwardly to expose the interior of the chamber. The doors may be held in the closed position in any suitable manner and in the drawings uprights 56ª are stepped in the base 54 and extend through the top 57 where they are held by wedges 56ᵇ so that on the removal of the wedges the posts 56ª can be removed and the doors be free to be opened. Of course, it will be understood that the showing of the drawings is only indicative and that in the practical form of the compress a more convenient means of fastening the doors together may be employed. Threaded through a threaded boss 60 at the center of the top 57 is a threaded rod 61 carrying a hollow plunger 62 having fast to its lower end a ring shaped follower 63 conforming in size to the bed plate 55. Within the hollow plunger 62 and spaced from the inner walls thereof is an annular flange 64 elongated in the direction of the length of the plunger and exteriorly screw threaded for the reception of one end of an interiorly screw threaded sleeve 65 constituting an interior forming member as will hereinafter appear. The sleeve 65 is of a length to enter the annular bed plate 55 when the plunger has reached the lower limit of its travel. The extent of travel of the plunger 62 is regulated by the extent of axial projection of the sleeve 65. To facilitate the adjustment of the sleeve 65, it is provided near its lower end with a series of holes or sockets 66 permitting the introduction of a rod or other tool to turn the sleeve screwing it into or out of the plunger 62. Adapted to the space between the bed plate 55 and the plunger ring 63, are annular molding members 67, 68 having the faces directed toward each other hollow or concave as indicated at 69, the cross sectional curvature of the hollow faces corresponding to the cross sectional curvature to be imparted to the filler produced by the coaction of the molding rings 67 and 68 upon the mass of horsehair, such mass being indicated at 70. The hollow faces 69 are provided with grooves 71 so related as to provide threading grooves for a binding cord 72 wound about the compressed mass 70 of horsehair constituting a tire core while such mass of horsehair is held in the compressed condition between the molding members 67 and 68.

When the press is in operation, the molding member 68 rests upon the bed plate 55 while the plunger ring 63 supports the molding member 67 by means of connecting clips 73. In the operation of the press the follower 62 is lifted carrying with it, the upper molding ring 67 and by opening the doors 58 horsehair is deposited upon the lower molding ring 68 and then compressed by lowering the plunger 62. This operation may be repeated a suitable number of times until the desired quantity of horsehair is introduced so that when compressed to a size permitting it to be introduced into a tire casing, the pressure necessary will reach, say, fifty or more pounds per square inch. After the final compression has been obtained, the lower doors 59 of the press are opened and clamps 74 are applied to the rings 67 and 68 to hold these rings together. In the drawings, four such clamps are shown; but it will be understood that as many clamps are employed as may be necessary to hold the rings 67 and 68 together with the compressed mass 70 of horsehair between them. Then they are removed from the press through the space provided by the doors 59 where open on one side of the press. Now the lacing 72 is applied, beginning at any desired point and continued about the horsehair core until the beginning point is again reached, there the lacing may be stopped. Now the clamps 74 are loosened and removed and the molding rings 67 and 68 are also removed from the lace compressed core, thus leaving the latter ready for use in a tire casing. Because of the high compression, such a core is rather stiff and it is therefore advisable to cut the core across between the commencing and ending points of the lacing. This greatly facilitates the introduction of the core into the tire casing, since the beads of the latter are not readily supported throughout the length of the casing as would be needed were it attempted to introduce a complete circular core into the casing. It will be understood, of course, that the clips 73 are removed when the compressed core with the molds 67 and 68 held thereon by the clamps 74, is removed from the press. To accommodate the clamps 74, the bed plate 55 may be recessed as shown at 75 and the ring 63 may be recessed as shown at 76. Rubber solution may be applied to the core formed by the compress of Figs. 13 to 15 in the manner already described. While the plunger of the press of Figs. 13 to 15 has been shown as operated by a screw, it will be understood that any other means for operating the plunger may be employed, and in practice hydraulic pressure is advisable. For this reason, the actuating screw for the plunger is to be taken as indicative means for operating the plunger.

What is claimed is:—

1. A filler for casings of vehicle tires, comprising a spongy mass composed of elastic fibers and an elastic binder partly filling the interstices of the fibrous mass and leaving numerous spaces free.

2. A filler for casings of vehicle tires, comprising a mass of horsehair containing so much gum as will cling to the horsehair when the mass is infiltrated by a solution of the gum and drained and dried.

3. A filler for casings of vehicle tires, comprising a mass of horsehair containing so much soft rubber as will cling to the horsehair when the mass is infiltrated with a solution of soft rubber and drained and dried.

4. A tire for vehicles, comprising a casing and a filler therefor consisting of a compressed spongy mass of normally elastic fibers and an elastic gum adherent to the fibers and incompletely filling the interstices of the mass before compression, and said mass being of greater cross-sectional area before compression than that of the interior of said casing.

5. A vehicle tire comprising a casing and a filler therefor consisting of a compressed mass composed of horsehair and an elastic gum incompletely filling the interstices of the mass of horsehair before compression.

6. A vehicle tire comprising a casing and a filler therefor consisting of a compressed mass composed of horsehair and soft rubber united before compression, said rubber being associated with the horsehair to incompletely fill the interstices of the mass before compression.

7. A vehicle tire comprising a casing and a filler consisting of a mass of horsehair of initially greater cross-section than that of the casing and containing so much soft rubber as will cling to the horsehair when the mass is infiltrated with a solution of soft rubber and drained and dried, said mass being compressed to an extent permitting introduction into the casing and to then exert an expansive force sufficient to sustain the load desired to be carried by the tire.

8. A filler for casings of vehicle tires, comprising a mass of fibrous material, the fibers of which are normally elastic, and so much elastic gum distributed through the mass as will cling thereto when said mass is infiltrated or saturated with a liquid solution of the gum and drained and dried.

9. A filler for a vehicle tire having a substantially inextensible casing, comprising a mass of horsehair treated with a solution of gum and initially of greater cross-sectional area than the interior of the casing and compressed as a whole before introduction into the casing to a cross-sectional area permitting such introduction, the volume of the treated horsehair and the degree of compression previous to introduction into the casing being sufficient to cause the exertion of an expansive force within the casing corresponding to the load to be sustained by the tire, whereby the filler may be wholly introduced into the casing while in the compressed condition and on release from such compression exert an expansive force evenly throughout the tire.

10. A filler for a vehicle tire having a substantially inextensible casing, comprising a series of layers of horsehair with each layer treated with a solution of gum, and the series of layers having initially a greater cross-sectional area than the casing and compressed as a whole before introduction into the casing to a cross-sectional area permitting such introduction, the volume of the treated horsehair and the degree of compression previous to introduction into the casing being sufficient to cause the exertion of an expansive force within the casing corresponding to the load to be sustained by the tire, whereby the filler may be wholly introduced into the casing while in the compressed condition and on release from such compression exert an expansive pressure evenly throughout the tire.

11. A vehicle tire comprising an outer casing with a filler therein in a state of compression and comprising a spongy mass of horsehair and rubber.

12. A vehicle tire comprising an outer casing with a filler therein under compression and exerting an expansive force on the inner wall of the casing sufficient to sustain the load for which the tire is designed, said filler comprising a compressed spongy mass of horsehair and rubber infiltrating said mass.

13. A filler for casings of vehicle tires, comprising a mass of fibrous material composed of normally elastic fibers, and so much soft rubber distributed therethrough as will cling thereto when the mass is infiltrated or saturated with a liquid solution of rubber and dried.

In testimony, that I claim the foregoing as my own, I have hereto affixed my signature in the presence of two witnesses.

GEORGE KELLY.

Witnesses:
ELEANOR C. HALL,
GEO. W. HALL.